(12) United States Patent
Camaisa et al.

(10) Patent No.: US 8,079,070 B2
(45) Date of Patent: Dec. 13, 2011

(54) SYSTEM AND METHOD FOR BLOCKING UNAUTHORIZED NETWORK LOG IN USING STOLEN PASSWORD

(75) Inventors: Allan Camaisa, Las Vegas, NV (US); Jonas Samuelsson, San Diego, CA (US)

(73) Assignee: Anakam LLC, Las Vegas, NV (US)

( * ) Notice: Subject to any disclaimer, the term of this patent is extended or adjusted under 35 U.S.C. 154(b) by 1682 days.

(21) Appl. No.: 11/077,948

(22) Filed: Mar. 11, 2005

(65) Prior Publication Data

US 2006/0015743 A1     Jan. 19, 2006

Related U.S. Application Data

(63) Continuation-in-part of application No. 10/892,584, filed on Jul. 15, 2004, now Pat. No. 7,676,834.

(51) Int. Cl.
   *H04L 29/06*     (2006.01)
(52) U.S. Cl. ................. 726/10; 726/5; 726/7; 726/9
(58) Field of Classification Search ............ 726/2, 3, 726/5, 7, 10; 713/155, 168, 185; 709/219, 709/225, 229

See application file for complete search history.

(56) References Cited

U.S. PATENT DOCUMENTS

| | | |
|---|---|---|
| 4,869,717 A | 9/1989 | Adair |
| 5,590,199 A | 12/1996 | Krajewski et al. |
| 5,737,421 A | 4/1998 | Audebert |
| 5,802,176 A | 9/1998 | Audebert |
| 5,887,065 A | 3/1999 | Audebert |
| 5,937,068 A | 8/1999 | Audebert |
| 5,982,898 A | 11/1999 | Hsu et al. |
| 6,035,404 A | 3/2000 | Zhao |
| 6,047,268 A | 4/2000 | Bartoli et al. |
| 6,076,163 A | 6/2000 | Hoffstein |
| 6,085,320 A | 7/2000 | Kaliski |
| 6,130,621 A | 10/2000 | Weiss |

(Continued)

FOREIGN PATENT DOCUMENTS

WO     WO 03/007571 A1     1/2003

OTHER PUBLICATIONS

Camasia et al., "System and Method for Blocking Unauthorized Network Log in Using Stolen Password" File History for Pending U.S. Appl. No. 10/892,584.

(Continued)

*Primary Examiner* — Minh Dinh
*Assistant Examiner* — Izunna Okeke
(74) *Attorney, Agent, or Firm* — Kilpatrick Townsend & Stockton LLP

(57) ABSTRACT

When a user successfully logs in to an information server such as an online banking server, an e-commerce server, or a VPN server, for greater security communication is transferred transparently to the user to an authentication server for additional authentication. The additional authentication can include comparing elements of a previously deposited cookie on the user computer to test elements, and if the elements, match, granting access and transparently transferring the user computer back to the information server. If the secondary authentication fails, however, the user may be asked questions as tertiary authentication, or a PIN code can be sent to the user's cell phone, which PIN code can then be input on the user computer to gain access.

19 Claims, 4 Drawing Sheets subsequent log-ins

U.S. PATENT DOCUMENTS

| | | | |
|---|---|---|---|
| 6,157,920 | A | 12/2000 | Jakobsson |
| 6,189,098 | B1 | 2/2001 | Kaliski |
| 6,202,159 | B1 | 3/2001 | Ghafir et al. |
| 6,240,184 | B1 | 5/2001 | Huynh |
| 6,269,163 | B1 | 7/2001 | Rivest |
| 6,286,022 | B1 | 9/2001 | Kaliski |
| 6,308,268 | B1 | 10/2001 | Audebert |
| 6,317,777 | B1 | 11/2001 | Skarbo et al. |
| 6,373,969 | B1 | 4/2002 | Adler |
| 6,374,359 | B1 * | 4/2002 | Shrader et al. ............ 726/5 |
| 6,389,442 | B1 | 5/2002 | Yin |
| 6,393,447 | B1 | 5/2002 | Jakobsson |
| 6,411,715 | B1 | 6/2002 | Liskov |
| 6,429,927 | B1 | 8/2002 | Borza |
| 6,434,259 | B1 | 8/2002 | Hamid |
| 6,446,052 | B1 | 9/2002 | Juels |
| 6,446,210 | B1 | 9/2002 | Borza |
| 6,460,141 | B1 | 10/2002 | Olden |
| 6,498,861 | B1 | 12/2002 | Hamid |
| 6,584,505 | B1 * | 6/2003 | Howard et al. ............ 709/225 |
| 6,598,072 | B1 | 7/2003 | McBreaty et al. |
| 6,662,231 | B1 | 12/2003 | Drosset et al. |
| 6,694,436 | B1 | 2/2004 | Audebert |
| 6,700,606 | B1 | 3/2004 | Borza |
| 6,721,891 | B1 | 4/2004 | Borza |
| 6,751,654 | B2 * | 6/2004 | Massarani et al. ............ 709/219 |
| 6,760,844 | B1 | 7/2004 | McCarthy et al. |
| 6,769,068 | B1 | 7/2004 | Brozowski et al. |
| 6,772,954 | B2 | 8/2004 | Boyer |
| 6,813,354 | B1 | 11/2004 | Jakobsson |
| 6,831,980 | B1 | 12/2004 | Borza |
| 6,836,845 | B1 * | 12/2004 | Lennie et al. ............ 713/181 |
| 6,848,052 | B2 | 1/2005 | Hamid |
| 6,857,078 | B2 | 2/2005 | Colvin |
| 7,032,026 | B1 | 4/2006 | Biswas |
| 7,100,049 | B2 * | 8/2006 | Gasparini et al. ............ 713/170 |
| 7,345,775 | B2 | 3/2008 | Kimura |
| 7,346,775 | B2 * | 3/2008 | Gasparinl et al. ............ 713/170 |
| 7,360,096 | B2 * | 4/2008 | Bracewell et al. ............ 713/183 |
| 7,418,596 | B1 | 8/2008 | Carroll |
| 7,426,530 | B1 | 9/2008 | Rosko et al. |
| 7,464,162 | B2 | 12/2008 | Chan |
| 7,536,433 | B2 | 5/2009 | Reilly |
| 7,562,222 | B2 | 7/2009 | Gasparini et al. |
| 7,571,466 | B2 | 8/2009 | Mitchell et al. |
| 7,665,127 | B1 | 2/2010 | Rao et al. |
| 7,676,834 | B2 | 3/2010 | Camaisa et al. |
| 2001/0014895 | A1 | 8/2001 | Sappal |
| 2001/0037451 | A1 | 11/2001 | Bhagavatula |
| 2001/0044896 | A1 | 11/2001 | Schwartz et al. |
| 2002/0029279 | A1 | 3/2002 | Campbell et al. |
| 2002/0031230 | A1 | 3/2002 | Sweet et al. |
| 2002/0131402 | A1 | 9/2002 | Lee et al. |
| 2002/0133706 | A1 | 9/2002 | Khanna et al. |
| 2002/0169961 | A1 | 11/2002 | Giles et al. |
| 2002/0184496 | A1 | 12/2002 | Mitchell et al. |
| 2003/0005308 | A1 | 1/2003 | Rathbun et al. |
| 2003/0018707 | A1 | 1/2003 | Flocken |
| 2003/0033245 | A1 | 2/2003 | Kahr |
| 2003/0046551 | A1 * | 3/2003 | Brennan ............ 713/185 |
| 2003/0093430 | A1 | 5/2003 | Mottur |
| 2003/0097573 | A1 | 5/2003 | Wheeler |
| 2003/0149900 | A1 | 8/2003 | Glassman et al. |
| 2003/0159068 | A1 | 8/2003 | Halpin et al. |
| 2003/0177351 | A1 | 9/2003 | Skingle |
| 2003/0188186 | A1 | 10/2003 | Cherry |
| 2003/0200202 | A1 | 10/2003 | Hsiao |
| 2003/0217288 | A1 | 11/2003 | Guo et al. |
| 2003/0229782 | A1 | 12/2003 | Bible, Jr. et al. |
| 2004/0059951 | A1 * | 3/2004 | Pinkas et al. ............ 713/202 |
| 2004/0098609 | A1 | 5/2004 | Bracewell et al. |
| 2004/0103203 | A1 | 5/2004 | Nichols et al. |
| 2004/0103297 | A1 | 5/2004 | Risan et al. |
| 2004/0103300 | A1 | 5/2004 | Risan et al. |
| 2004/0111621 | A1 | 6/2004 | Himberger et al. |
| 2004/0123103 | A1 | 6/2004 | Risan et al. |
| 2004/0136510 | A1 | 7/2004 | Vander Veen |
| 2004/0139318 | A1 | 7/2004 | Fiala et al. |
| 2004/0143523 | A1 | 7/2004 | Pegaz-Paquet et al. |
| 2004/0168083 | A1 | 8/2004 | Gasparini |
| 2004/0172535 | A1 | 9/2004 | Jakobsson |
| 2004/0187018 | A1 | 9/2004 | Owen et al. |
| 2004/0250076 | A1 | 12/2004 | Kung |
| 2005/0015601 | A1 * | 1/2005 | Tabi ............ 713/182 |
| 2005/0054994 | A1 | 3/2005 | Cioanta et al. |
| 2005/0108551 | A1 | 5/2005 | Toomey |
| 2005/0138109 | A1 | 6/2005 | Redlich et al. |
| 2005/0165276 | A1 | 7/2005 | Belson et al. |
| 2005/0177730 | A1 | 8/2005 | Davenport et al. |
| 2005/0183032 | A1 | 8/2005 | Bushey et al. |
| 2005/0268107 | A1 | 12/2005 | Harris |
| 2006/0069921 | A1 | 3/2006 | Camaisa et al. |
| 2006/0106605 | A1 | 5/2006 | Saunders et al. |
| 2007/0123840 | A1 | 5/2007 | Cox |
| 2007/0136517 | A1 | 6/2007 | Edling |
| 2007/0136573 | A1 | 6/2007 | Steinberg |
| 2007/0163585 | A1 | 7/2007 | Uesugi et al. |
| 2007/0180496 | A1 | 8/2007 | Fransdonk |
| 2007/0203517 | A1 | 8/2007 | Williams et al. |
| 2007/0266257 | A1 | 11/2007 | Camaisa et al. |
| 2008/0091682 | A1 | 4/2008 | Lim |
| 2008/0114980 | A1 | 5/2008 | Sridhar |
| 2008/0189776 | A1 | 8/2008 | Constable |
| 2008/0250477 | A1 | 10/2008 | Samuelsson et al. |
| 2008/0301570 | A1 | 12/2008 | Milstead et al. |
| 2009/0094674 | A1 | 4/2009 | Schwartz et al. |
| 2009/0259848 | A1 | 10/2009 | Williams et al. |
| 2010/0100967 | A1 | 4/2010 | Douglas et al. |

OTHER PUBLICATIONS

Camaisa, et al., "System and Method for Blocking Unauthorized Network Log in Using Stolen Password", File History for pending U.S. Appl. No. 11/257,421.

Rodry, "Cookie based authentication: is it secure?", Published on Aug. 28, 2000, http://www.perimonks.org?node_id=29928, Retrieved data Apr. 10, 2009.

U.S. Appl. No. 11/257,421—Camaisa et al.; Non-Final Office Action dated Oct. 19, 2009.

U.S. Appl. No. 10/892,584—Camaisa et al.—Non-final office action dated Jul. 6, 2007.

Non-Final Office Action for U.S. Appl. No. 12/142,232, mailed Dec. 9, 2010 (11 pages).

Final Office Action for U.S. Appl. No. 12/142,232, mailed Mar. 29, 2011 (11 pages).

Non-final Office Action for U.S. Appl. No. 11/824,694, mailed Jun. 10, 2010 (31 pages).

Final Office action for U.S. Appl. No. 11/824,694, mailed Aug. 31, 2010 (42 pages).

Non-final Office Action for U.S. Appl. No. 11/824,694, mailed Jan. 10, 2011 (30 pages).

Final Office action for U.S. Appl. No. 11/824,694, mailed Mar. 1, 2011 (33 pages).

Notice of Allowance for U.S. Appl. No. 10/892,584, mailed Dec. 29, 2009 (16 pages).

Non-Final Office Action for U.S. Appl. No. 11/257,421, mailed Apr. 14, 2010 (25 pages).

Final Office Action for U.S. Appl. No. 11/257,421, mailed Jul. 7, 2010 (29 pages).

Response to Office Action for U.S. Appl. No. 11/257,421, filed Apr. 16, 2010 (8 pages).

Response to Office Action for U.S. Appl. No. 11/824,694, filed Jun. 25, 2010 (18 pages).

Amendment and Response to Final Office Action for U.S. Appl. No. 11/824,694, filed Jul. 1, 2011 (22 pages).

Response to Office Action for U.S. Appl. No. 11/824,694, filed Dec. 2, 2010 (12 pages).

Response to Office Action for U.S. Appl. No. 11/824,694, filed Jan. 19, 2011 (14 pages).

Response to Notice of Non-Compliant Amendment for U.S. Appl. No. 12/142,232, filed Jan. 20, 2011 (8 pages).

Corrected Response to Office Action for U.S. Appl. No. 10/892,584, filed Nov. 4, 2009 (9 pages).

Amendment and Response to Final Office Action, for U.S. Appl. No. 12/142,232, filed Jul. 29, 2011, 11 pages).

Jonas Samuelsson, Allan Camaisa, "System and Method for Second Factor Authentication Services", Non-Final Office Action dated Dec. 9, 2010 of co-pending U.S. Appl. No. 12/142,232, filed Jun. 19, 2008.

Jonas Samuelsson, Allan Camaisa; "System and Method for Second Factor Authentication Services", Amendment filed Jan. 20, 2011 in response to Non-Final Office Action dated Dec. 9, 2010 of co-pending U.S. Appl. No. 12/142,232, filed Jun. 19, 2008.

Allan Camaisa, Jonas Samuelsson, "System and Method for Blocking Unauthorized Network Log in Using Stolen Password", Non-final Office action dated Jan. 10, 2011 from co-pending U.S. Appl. No. 11/824,694, filed Jul. 2, 2007.

Allan Camaisa, Jonas Samuelsson, "System and Method for Blocking Unauthorized Network Log in Using Stolen Password", Amendment filed Jan. 19, 2011 in response to Non-final Office action dated Jan. 10, 2011 from co-pending U.S. Appl. No. 11/824,694, filed Jul. 2, 2007.

* cited by examiner

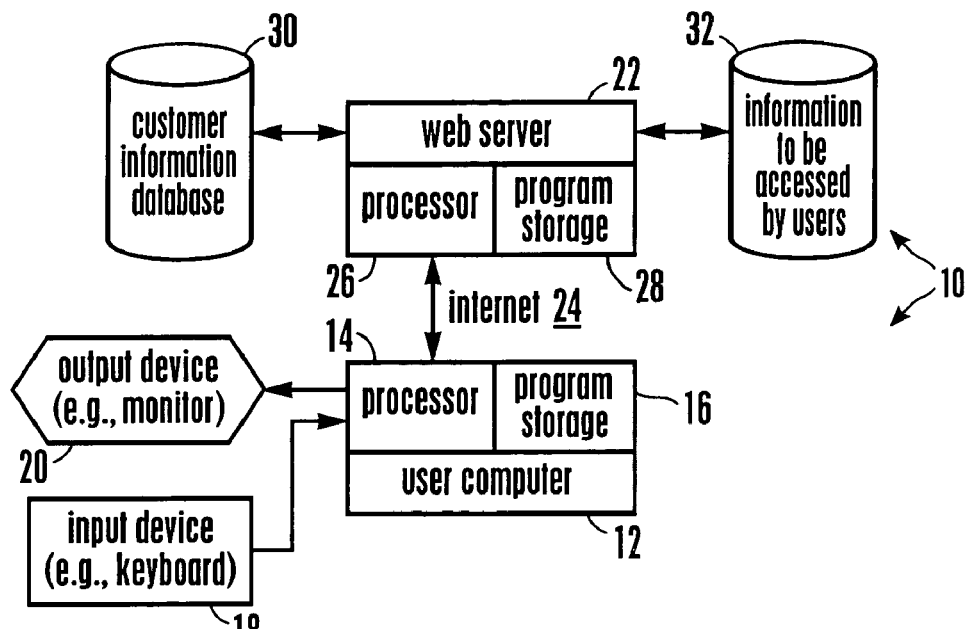
Figure 1 system
Figure 2 registration logic
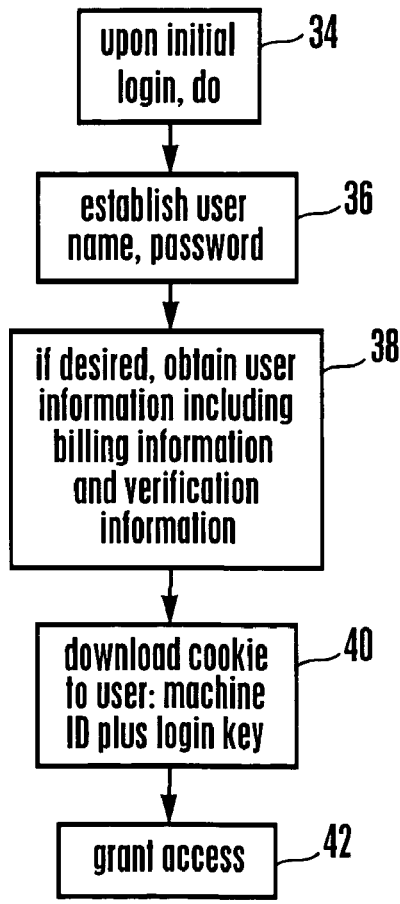

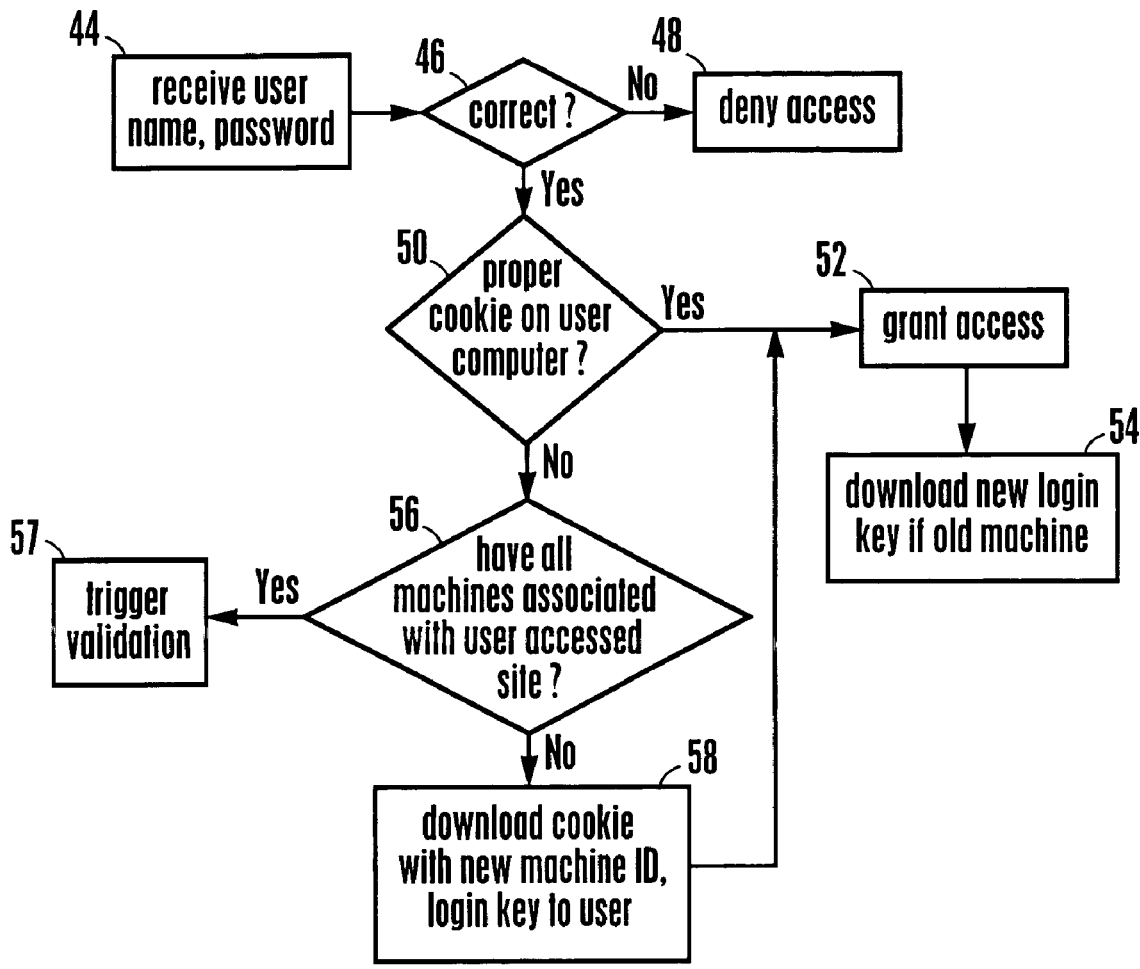
Figure 3   subsequent log-ins

# SYSTEM AND METHOD FOR BLOCKING UNAUTHORIZED NETWORK LOG IN USING STOLEN PASSWORD This application is a continuation-in-part of and claims priority from co-pending U.S. patent application Ser. No. 10/892,584, filed Jul. 15, 2004.

FIELD OF THE INVENTION

The present invention relates generally to preventing unauthorized network log in using a stolen password.

BACKGROUND OF THE INVENTION

Passwords are a ubiquitous way to provide a minimal level of authentication to a computer user seeking to access a network computer such as a Web site. For instance, online banking requires a user to log in to a Web server of a financial institution using a user name and password that have been previously given to the user by the server. In this way, only a user (hopefully, the true account owner) who possesses both the user name and password can gain access to the user's account.

As another example, some Web servers provide subscription services. For instance, users can subscribe to a Web site to receive news publications, music titles, etc. To ensure that only users who have paid the subscription fee can access the content, a user seeking access is required to log in using a user name and password.

In either case, it is possible that a password can be stolen and information intended only for the rightful owner of the password consequently fall into the hands of a password thief. Some estimates for the year 2003 indicate that as many as two million Americans have had their online bank accounts raided, at an average loss of $1200 for a total loss in excess of $2 billion. A common way for thieves to gain access is to send official-looking emails to bank customers, requesting user names and passwords which, if the illegitimate requests are complied with, are then used to log in to online accounts and drain them of money. Having recognized the above problem, the solution herein is provided.

SUMMARY OF THE INVENTION

A method for selectively granting a user access to data includes, at a Web server, receiving a user name and password from a user computer. Without limitation the Web server may be an online banking server or a content subscription server. If the user name and password are valid, a previously-deposited cookie on the user computer is accessed, and the server determines whether the cookie is valid. Only if the cookie, user name, and password are valid is access granted to the data to the user computer. Otherwise, a user validation process is initiated.

In non-limiting embodiments the cookie includes at least a login key and a machine ID. If the cookie, user name, and password are valid and access is granted to the user computer, a new cookie subsequently is downloaded to the user computer for use during the next login attempt. The new cookie includes the same machine ID as the old cookie but a different login key.

If desired, non-limiting methods may further include, prior to initiating a user validation process when a valid cookie is not found on the user computer, determining whether all N machines allocated by the server to the user have accessed the server, wherein $N \geq 1$. If not, the server downloads a cookie to the user computer that is attempting access, with this cookie having a unique machine ID and a unique login key. The server then grants the user computer access, perhaps after successful validation.

Exemplary non-limiting examples of the validation process can include sending an email to the user, with the email containing at least one hyperlink to a Web site at which a new cookie that is valid for accessing the data may be obtained. Access to the Web site at which the new cookie is located can be disabled after the user clicks on the hyperlink. Or, the validation process can include prompting the user to call a telephone number to verify predetermined information, or to access a Web site to verify predetermined information online.

In another aspect, a system is disclosed for impeding a thief possessing a password of a user from accessing information intended to be accessed by the user. The system includes at least one user computer associated with the user, and a server computer controlling access to the information. The server computer grants access to the information only upon receipt of a valid password and determination that a valid verification string resides on the user computer; otherwise, the server initiates a validation process.

In yet another aspect, a computer system includes a Web server that has means for sending a user name and a password to a user computer, and means for sending a verification string to the user computer. The verification string includes a machine ID that is substantially unique to the user computer and a login key that is refreshed each time the user computer accesses the Web server. The server also has means for, subsequent to sending the verification string to the user computer and in response to an attempted log in from a login computer that may or may not be the user computer, determining whether a password sent from the login computer is valid, and whether the verification string resides on the login computer. Means are provided for, if the password is valid but the verification string does not reside on the login computer, refusing access and then initiating a validation process, and/or determining whether all N machines allocated to the user have accessed the server. If not all allocated machines have accessed the server, a verification string having a machine ID that is different from the machine ID of the user computer and a login key that is different from the login key of the user computer is downloaded to the login computer, which can then be granted access.

In another embodiment, a method for selectively granting a user access to data includes, at an information server, receiving a user name and password from a user computer. The method also includes, if the user name and password are valid, transparently to a user of the user computer transferring user computer communication to an authentication server. Then, at the authentication server, it is determined whether a cookie previously deposited on the user computer includes a machine ID matching a test machine ID and a login key matching a test login key. If so, transparently to a user of the user computer, user computer communication is transferred back to the information server and access to the data is granted to the user computer. The login key is also refreshed. If the cookie test fails, however, the method does not grant the user computer access to the data absent additional authentication steps.

In some embodiments, if the machine ID does not match the test machine ID, additional authentication steps are executed. In this case, the additional authentication steps may include sending a PIN code to a wireless telephone associated with the user, and receiving from the user computer the PIN code from the user obtained from the wireless telephone. Or, as stated above the PIN code can be sent to an email account of the user. In other embodiments, if the machine ID matches the test machine ID but the login key does not match the test login key, no additional authentication steps are executed and an account associated with the user is disabled.

The information server may be, e.g., an online banking server, an e-commerce server, or a VPN server.

In another aspect, an authentication system for at least one user computer associated with a user includes at least one information server controlling access to information. The information server receives initial authentication data from the user computer and if the initial authentication data is valid, transparently to a user of the user computer transfers communication to at least one authentication server. The authentication server executes secondary authentication with the user computer and if the secondary authentication is valid, transparently to a user of the user computer communication is transferred back to the information server for accessing the information. Otherwise, an account associated with the user is disabled, and/or tertiary authentication is executed, the successful completion of which causes the authentication server, transparently to a user of the user computer, to transfer communication back to the information server for accessing the information.

In yet another aspect, an authentication server configured for communicating with at least one user computer and at least one information server includes means for authenticating the user computer using a previously deposited cookie on the user computer. The authentication server also includes means, responsive to the means for authenticating, for informing the information server to grant access to the user computer. The authentication server further includes means, responsive to the means for authenticating, for transferring user computer communication back to the information server.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an exemplary system for implementing the present invention;
FIG. 2 is a flow chart of the registration logic;
FIG. 3 is a flow chart of the subsequent log in logic.

DETAILED DESCRIPTION OF THE PREFERRED EMBODIMENT

Figure 4:
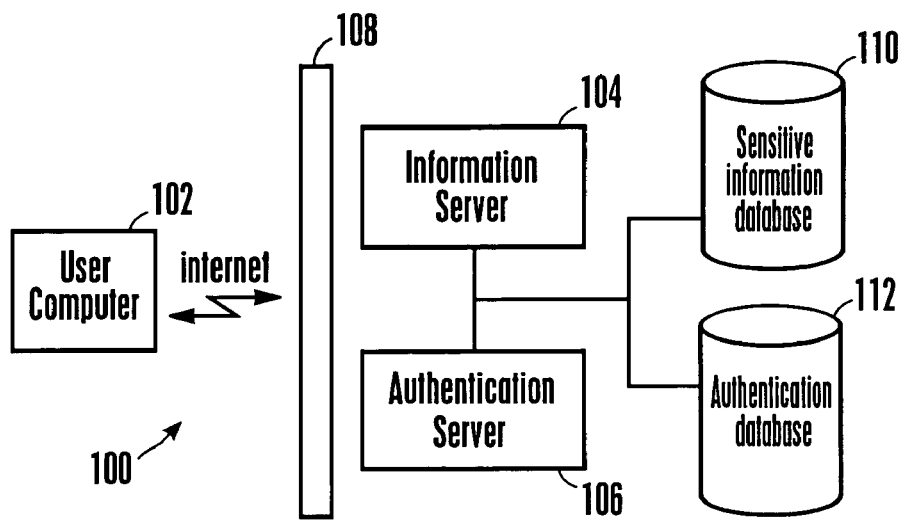
FIG. 4 is a block diagram of another non-limiting system.

Referring initially to FIG. 1, a system is shown, generally designated 10, that includes plural user computers 12 (only a single user computer shown for clarity) each of which can have a processor 14 and disk and/or solid state program storage 16 for storing software embodying logic. Also, each user computer 12 can include one or more input devices 18 such as keyboards, mice, voice recognition devices, etc. as well as one or more output devices 20 such as monitors, printers, other computers, etc. The authentication logic executed by the present system and discussed herein may be used in applications such as but not limited to online banking, secure online e-commerce, and VPN access control.

As shown in FIG. 1, the user computer 12 communicates with a Web server 22 over the Internet 24. The server 22 has a processor 26 and disk and/or solid state program storage 28 for storing software embodying logic including all or part of the logic discussed further below. The server 22 may access a customer information database 30 that contains the log in and registration information on users set forth further below, it being understood that the database can be pre-populated with user information on existing customers who elect to start up the present service. Also, the server 22 may access an information database 32 to supply users with desired information, e.g., bank account records, subscription content, etc. The databases 30, 32 may be implemented in a single data structure if desired.

Now referring to the initial registration logic of FIG. 2, commencing at block 34, the user logs in for the initial time. Moving to block 36, a user name and a password are established, for instance by allowing the user to select a user name and password or with the server 22 conferring a user name and password on the user. In block 38, additional user information can be obtained if desired. Such user information might include billing information and validation information. The validation information can be confidential to the user so as to protect his account from outside unwanted users who might have stolen the user's account information, in accordance with further logic set forth below. It is to be understood that the validation information alternatively can be previously obtained from the user in various ways, online or off-line.

At block 40, at the same time the user registers or subsequently in the case of users who are already registered with the server for other purposes but now for the first time commence the present service, the user's computer is sent a verification string. The verification string is preferably but not necessarily one that does not require user interaction or special software, such as a cookie that can have a machine ID and a login key, e.g., a 4096 bit string with randomly generated value. The cookie may also have a user ID that is unique to a person. The cookie requires no special client software and is completely invisible to the user. Both the machine ID and the login key are randomly generated, stored on the server, and associated with that user's account. Once the user's account is established, the machine ID and the login key become associated with that user's account. Access is granted if all user information and user account information is correct, shown in block 42.

After registration the logic that can be implemented by the server 22 moves to FIG. 3 for subsequent attempts by the user to log on to the server 26 and access the user information contained in the database 32 shown in FIG. 1. Beginning with block 44, upon subsequent logins the user enters the user name and password. At decision diamond 46, the server checks the user name and password's validity. If the user name and password are not correct, user access is denied at block 48.

If, at decision diamond 46, it is determined that the user name and password are correct, the logic flows to decision diamond 50 wherein the server checks the user's computer to verify the correct cookie is stored on the user's computer by, e.g., comparing the cookie on the user's computer with server cookie records. If the server determines the cookie is present and correct, access to the user information in the database 32 is granted at block 52. Then, at block 54, assuming that the machine being used is not a newly entered machine as discussed further below in relation to block 58, a new login key carried on a new cookie preferably over an SSL encrypted link is downloaded. This new cookie with new login key is used for the next user login using the same machine. The login key in the new cookie is different from the login key of the old cookie but the machine ID stays constant.

In contrast, if, at decision diamond 50, it is determined that the cookie on the user computer is not correct, in some optional embodiments the server 22 moves to decision diamond 56 to determine whether all the computers that have been allocated to the user have accessed the server 22. In other words, in some applications such as online banking the server may allocate to the user at registration, in response to a user request, more than a single computer (i.e., to use "N" computers, N≧1) to access the information in the database 32. For instance, an online banking customer might want to access his bank account from both an office computer and a home computer. If all of the "N" allocated computers that have been allocated to the user have accessed the server 22 and have been granted cookies, meaning that the currently used computer is in excess of the authorized number, user access is denied and the logic flows to block 57 to trigger a validation process. If desired, to foil a dictionary attack only a limited number of login/cookie verification attempts may be allowed from any one machine, after which the machine is locked out until successful validation occurs.

In a non-limiting implementation, the validation process can include the user entering the confidential information initially given in the initial login process. The validation information can be the user's mother's maiden name, the user's social security number, or some other information that preferably is personal to the user. The server 22 then checks the user input against the validation information that was gathered at block 38 in FIG. 2. If a match is found, validation is successful and the user is granted access; otherwise, validation is unsuccessful and access is denied.

In some implementations the validation process can include sending an email to the user. The email can contain a hyperlink to a Web site at which a new cookie that is valid for accessing the data may be obtained. If desired, access to the Web site at which a new cookie may be obtained can be disabled after the user clicks once on the hyperlink. Or, the validation process can include prompting the user to call a telephone number to verify predetermined information, or to access a Web site to verify predetermined information online. Once validation is successful, the server 22 permits access to the information in the database 32.

In contrast, if the server determines at decision diamond 56 that not all machines that have been allocated have accessed the server 22, a new cookie with a new machine ID and login key is downloaded to the new computer at block 58. The logic then loops back to block 52 to grant access, in some embodiments only after having triggered the validation first as described at block 57 to ensure that the correct user is logging in.

In the context of adding a new machine when more than a single user computer is authorized, the new machine can be automatically added at its first login in accordance with the logic above (assuming the above-described conditions have been met), or the server can ask the user of the new machine whether the new machine is to count as one of the "N" authorized machines, temporarily or otherwise. If the user indicates that the machine is to be temporary only (e.g., if the user is operating a terminal at a hotel), the user could specify an expiration date and/or number of logins after which any access to the user information from that machine would be denied, or at the least would trigger the verification process once again. This can be done by causing the cookie to be designated "expired" at the end of the period. For instance, at an in-hotel room terminal, a user might specify an expiration at the expected check out time, or a user could specify a number of logins to allow from that machine before the verification process is triggered again. The expiration information is stored at the server. When a machine expires, the number of new machines remaining to be added to the user's account may be reset by one. In contrast, the user would not be asked for temporary use information when communicating with the server from a core set of computers from which the user has authorized permanent access. One or more pieces of the above information that is transmitted between computers may be encrypted using, e.g., triple DES encryption.

Figure 5:
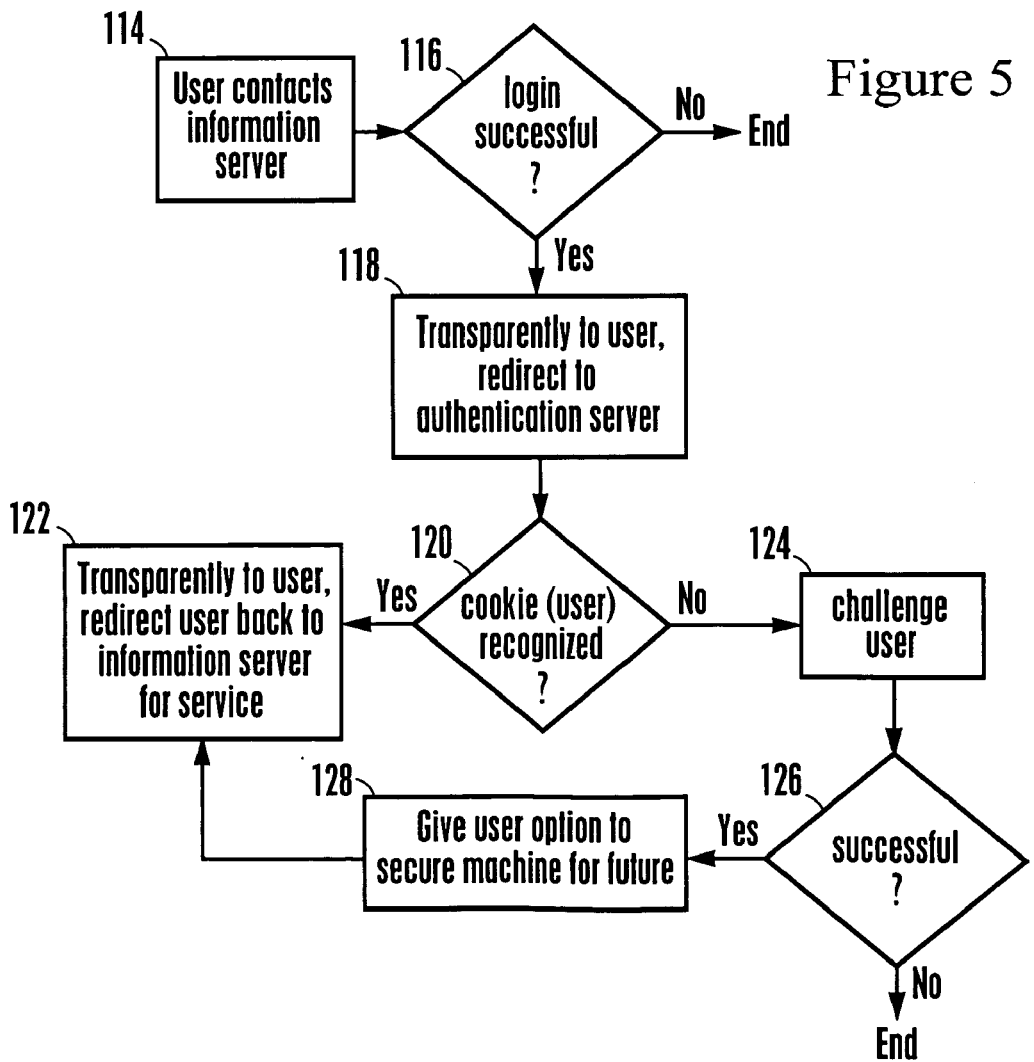
FIG. 5 is a high level flow chart of the logic used by the system shown in FIG. 4.
Figure 6:
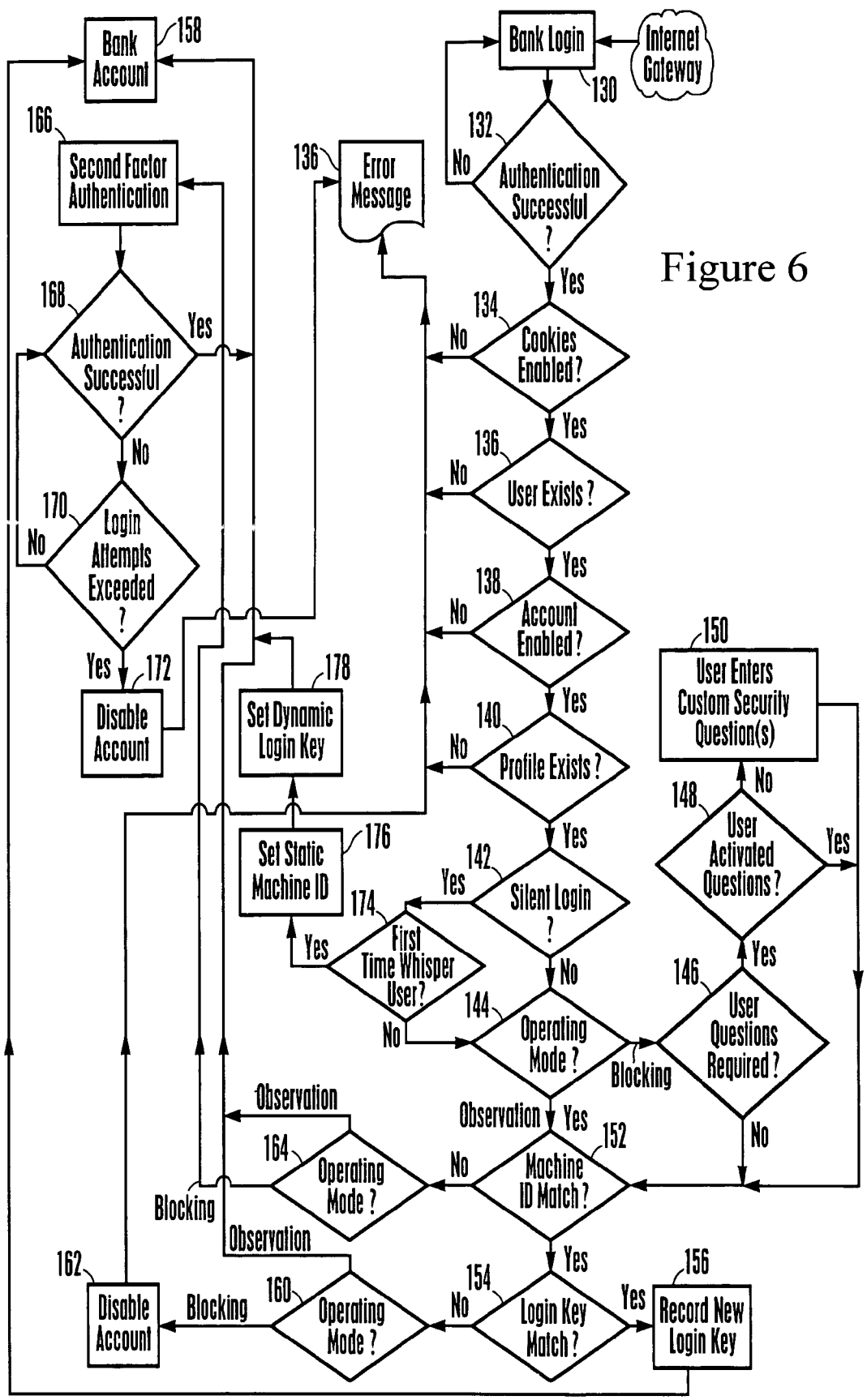
FIG. 6 shows greater details of the logic shown in FIG. 5.

FIGS. 4-6 show specific preferred implementations of the above logic and system. For simplicity, FIG. 4 omits certain details such as input devices and output devices. A preferred system 100 can include one or more user computers 102 that communicate via the Internet with, e.g., an information server 104 of a financial institution. The information server 104 communicates with an authentication server 106. Both the servers 104, 106 preferably are behind a firewall 108. While only a single information server 104 and only a single authentication server 106 are shown, it is to be understood that server clusters can be used. For instance, J2EE clusters that use memory replication session persistence can be used, where individual objects in the Httpsession are serialized to a backup server as they change, providing high performance and scalability. Also, when the authentication server 106 is behind the firewall 108, the use of secure socket layer (SSL) may not be necessary, although if access is required from an Extranet, SSL may be used.

In any case, the purpose of the system 100 is to permit controlled access of the user computer 102 to data in a sensitive information database 110, using authentication information in an authentication database 112. The information server 104 and sensitive information database 110 may be the conventional server/database used by, e.g., a financial institution, with the exceptions noted below. In contrast, the authentication server 106 and authentication database 112 may be add-ons in accordance with present principles. In any case, the databases herein may be, e.g., SQL servers, DB2 servers, Oracle servers, or lower end servers such as MySQL.

The logic of a preferred implementation of the logic is shown in FIGS. 5 and 6. While any appropriate software architecture may be used, in one implementation the object-oriented "Struts" framework of Apache Software Foundation may be used, wherein client requests to the information server 104 are cached and passed to the required business action as defined in the Struts configuration file. The XSD validation process may then be used to provide open data validation rules. The "View" is presented in a single JSP main page that uses XSL and XML to display the various page parts. The XSLT and XML provide full separation between presentation, business, and data layers. Further details of this particular version of J2EE design are known in the art and will be omitted for clarity.

FIG. 5 shows a high level logic flow that may be implemented by the system 100 shown in FIG. 4. Commencing at block 114, the user contacts the information server 104 using the user computer 102. This contact usually entails an initial authentication such as a login process that includes entering a user name and password. If the login process fails at decision diamond 116 the logic ends, but if it is successful the present invention proceeds to block 118, wherein user computer communication, transparently to the user, 14 is transferred to the authentication server 106. Communication between the servers 104, 106 may use SOAP principles known in the art.

At the authentication server 106, it is determined at decision diamond 120 whether the machine is recognized (using the machine ID in the above-disclosed cookie) and has been previously secured by the user (using the login key). This can be thought of as a secondary authentication process. If the test passes, the logic moves to block 122 to (transparently to the user) transfer the user back to the information server 104 for further service, e.g., for online banking transactions. On the other hand, if the test at decision diamond 120 fails, the logic can move to block 124 to challenge the user in accordance with principles set forth herein, which challenge might be thought of as a tertiary authentication process. For instance, an email or wireless telephone short message service (SMS) message can be sent to the user, containing a randomly generated single-use only personal identification number (PIN) code which is supplied by the authentication server 106. This single-use PIN code can then be sent by the user to the authentication server 106 using the user computer 102, to prove that the user is authorized access.

If the challenge is met successfully at decision diamond 126, the user is given the option at block 128 of securing the specific machine being used for future use, and then the user is redirected to the information server at block 122. Otherwise, the process ends without giving the user access.

FIG. 6 shows portions of a detailed non-limiting implementation of the logic shown in FIG. 5. Commencing at block 130, the user attempts the above-described login with the information server 104. If this is not successful at decision diamond 132, the logic loops back to block 130, but as disclosed above when the initial login with the information server 104 is successful, the logic, transparently to the user, is taken up by the authentication server 106 to determine, at decision diamond 134, whether the user computer 102 has disabled cookies. If cookies are disabled an error message is returned at state 136.

If the user has not disabled the cookie acceptance function, however, the logic flows from decision diamond 134 to decision diamond 138 to determine whether the user exists in the authentication database 112 as determined by, e.g., the user ID resident in the authentication cookie or by the user name used at block 130. If not, an error message is returned. Otherwise, the logic flows to decision diamond 138 to determine whether the user's account is enabled. This is done by checking a flag in the authentication database 112 indicating whether the user's account is enabled or disabled. If no account has been enabled for the user, an error message is returned, but otherwise the logic moves from decision diamond 138 to decision diamond 140 to determine whether a user profile exists.

By "user profile" is meant a factor associated with the user that indicates whether and what type of challenge is posed to the user if further authentication is required. In other words, the profile associated with a user determines what the user must provide to prove identity and thus, to gain access to the user account. This determination is made by checking whether the profile ID associated with the user in a users table in the authentication database 112 corresponds to a record in a profile table in the database. If no profile exists for the user, an error message is returned. When a profile exists, however, the logic flows to decision diamond 142 to determine whether the institution being served (e.g., a bank operating the information server 104) has instituted what might be though of as a "silent" login protocol. If this protocol has not been implemented, the logic moves to decision diamond 144 where it branches depending on the operating mode, again defined by the institution. In a "blocking" mode the logic moves to decision diamond 146 to determine whether user authentication questions are required. If so, the logic moves to decision diamond 148 to determine whether the user has activated questions. By "activating questions" is meant that the user has provided self-defined security questions and answers in the past (which test thus proves false only on first-time login), after which the user is not asked to provide or answer questions again absent the need for tertiary authentication. If the user has not activated questions, the user is prompted to answer institution-defined questions at block 150.

After block 150 or when no user questions are required, or if they are and the user has activated them, the logic flows to decision diamond 152 where it is determined whether the machine ID in the user's cookie matches the ID resident in the authentication database 112. If the machine ID matches, the logic next determines, at decision diamond 154, whether the above-described login key in the cookie matches the corresponding value in the authentication database 112, and if a match is found, a new login key is generated, recorded at block 156, and a new cookie constituted and sent to the user in accordance with prior disclosure. The user is then authenticated for, e.g., accessing the information server 104/information database 110 at block 158. The information server is notified of successful authentication and user computer communication is transferred back to the information server.

If the login key test fails at decision diamond 154, the logic moves to decision diamond 160 where it branches depending on the mode. In the blocking mode, the user's account is disabled at block 162 by appropriately setting the above-mentioned flag in the authentication database 112, and an error message is returned. However, in the observation mode the user is allowed to access his or her account at block 158.

Recall that at decision diamond 152 a machine ID test was undertaken. If the test fails, the logic moves to decision diamond 164 where it branches depending on the mode. In the blocking mode, the logic moves to block 166 to initiate second-factor authentication, e.g., the challenge discussed above in reference to FIG. 5. Instead of invoking the cell phone-delivered PIN method described above, the user can be asked the questions and the user's answers compared to those that were established at block 150. In any case, at decision diamond 168 it is determined whether the challenge was successfully responded to by the user, and if so account access is granted at block 158. Otherwise, the logic moves to decision diamond 170 to determine whether a predetermined number of login attempts has been made, and when the threshold is violated the user's account is disabled at block 172, and an error message is returned. However, in the observation mode at decision diamond 164 the user is allowed to access his or her account at block 158.

Recall that at decision diamond 142 it is determined whether the "silent" login feature is implemented. If it is, the logic moves to decision diamond 174 to determine whether the user, based on, e.g., the user name entered at login at block 130, is a first time user. If not, the logic flows to decision diamond 144 to operate as previously described. However, if the user is a first time user the logic moves to block 176 to establish the static machine ID discussed above, and then to block 178 to establish the one-time dynamic login key. Access is then granted at block 158.

Thus, in the silent login mode the user, once logged in for the first time with the information server 104, is automatically given the present authentication cookie (pending successful tests at decision diamonds 134-140), the login key portion of which is refreshed each time the user accesses his account. With respect to operating mode, in the observation mode the user is given access to his or her account regardless of cookie matches, whereas in the blocking mode higher security is enabled in accordance with the logic above.

While the particular SYSTEM AND METHOD FOR BLOCKING UNAUTHORIZED NETWORK LOG IN USING STOLEN PASSWORD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for selectively granting a user access to data, comprising:
   receiving, at an authentication server, communication that has been transferred, transparently to the user of a user computer, from an information server that is separate from the authentication server and in response to a valid user name and password being received by the information server, wherein the communication is with the user computer; and
   at the authentication server, responsive to determining that a cookie previously deposited on the user computer includes a machine ID matching a test machine ID at the authentication server and a login key matching a test login key at the authentication server,
      transparently to the user of the user computer transferring communication with the user computer back to the information server that is configured to grant the user computer access to the data in response to communication with the user computer being transferred back to the information server; and
      refreshing the login key on the user computer by depositing a new cookie on the user computer to replace the cookie, wherein the new cookie comprises the machine ID and a new login key.

2. The method of claim 1, further comprising:
   responsive to determining that the machine ID does not match the test machine ID at the authentication server, performing an additional authentication.

3. The method of claim 1, further comprising:
   responsive to determining that the machine ID matches the test machine ID at the authentication server and the login key does not match the test login key at the authentication server, causing an account associated with the user to be disabled.

4. The method of claim 2, wherein the additional authentication comprises:
   causing a PIN code to be outputted to a wireless telephone number associated with the user; and
   receiving from the user computer the PIN code from the user obtained from a wireless telephone associated with the wireless telephone number.

5. A information system comprising:
   an information server configured for transferring, transparently to a user of a user computer, communication with the user computer to an authentication server in response to determining that a user name and password received from the user computer are valid, wherein the authentication server is separate from the information server; and
   the authentication server configured for transferring, transparently to the user of the user computer, communication with the user computer back to the information server in response to determining that a cookie previously deposited on the user computer includes (i) a machine ID matching a test machine ID at the authentication server and (ii) a login key matching a test login key at the authentication server, the authentication server being further configured to refresh the login key on the user computer by depositing a new cookie on the user computer to replace the cookie in response to determining that the cookie previously deposited on the user computer includes (i) the machine ID matching the test machine ID at the authentication server and (ii) the login key matching the test login key at the authentication server, wherein the new cookie comprises the machine ID and a new login key,
   wherein the information server is configured for allowing the user computer to access data in response to the authentication server transferring communication with the user computer back to the information server.

6. The system of claim 5, wherein the authentication server is configured to deposit the new cookie on the user computer to replace the cookie without using software on the user computer.

7. The system of claim 5, wherein the authentication server is further configured to cause a PIN code to be outputted to a wireless telephone number associated with the user in response to determining that the machine ID does not match the test machine ID at the authentication server.

8. The system of claim 7, wherein the authentication server is further configured to transfer, transparently to the user of the user computer, communication with the user computer back to the information server in response to receiving the PIN code from the user computer.

9. The system of claim 5, wherein the authentication server is further configured to disable an account associated with the user in response to determining that the machine ID matches the test machine ID and that the login key does not match the test login key.

10. The system of claim 9, wherein the authentication server is configured to disable the account associated with the user by associating a flag with the account in a database.

11. The system of claim 5, wherein the information server is at least one of:
    an online banking server;
    an e-commerce server; or
    a virtual private network (VPN) server.

12. The system of claim 5, wherein the authentication server is configured for:
    allocating N>1 user computers to the user that are usable to access data,
    responsive to determining that at most N−1 user computers allocated to the user have previously accessed the server, generating a second new cookie and causing the second new cookie to be stored on the user computer, the second new cookie comprising (i) a second machine ID that is different from the machine ID and (ii) a second login key that is different than the login key.

13. The system of claim 12, wherein the authentication server is configured for generating the second new cookie and causing the second new cookie to be stored on the user computer by:

outputting an email addressed to the user, the email comprising a hyperlink to a Web site at which the second new cookie is downloadable to the user computer for storage.

14. An authentication system comprising:
a user computer; and
an authentication server configured for:
  receiving communication that has been transferred, transparently to a user of the user computer, from an information server that is separate from the authentication server and in response to a valid user name and password being received by the information server, wherein the communication is with the user computer; and
  responsive to determining that a cookie previously deposited on the user computer includes (i) a machine ID matching a test machine ID at the authentication server and (ii) a login key matching a test login key at the authentication server,
    transparently to the user of the user computer transferring communication with the user computer back to the information server that is configured to grant the user computer access to the data in response to communication with the user computer being transferred back to the information server; and
    refreshing the login key on the user computer by depositing a new cookie on the user computer to replace the cookie, wherein the new cookie comprises the machine ID and a new login key.

15. The authentication system of claim 14, wherein the authentication server is configured to deposit the new cookie on the user computer to replace the cookie without using software on the user computer.

16. The system of claim 14, wherein the authentication server is further configured to:
  cause a PIN code to be outputted to a wireless telephone number associated with the user in response to determining that the machine ID does not match the test machine ID at the authentication server; and
  transfer, transparently to the user of the user computer, communication with the user computer back to the information server in response to receiving the PIN code from the user computer.

17. The system of claim 14, wherein the information server is at least one of:
  an online banking server;
  an e-commerce server; or
  a virtual private network (VPN) server.

18. The system of claim 14, wherein the authentication server is configured for:
  allocating N>1 user computers to the user that are usable to access data; and
  responsive to determining that at most N−1 user computers allocated to the user have previously accessed the server, generating a new cookie and causing the new cookie to be stored on the user computer, the new cookie comprising (i) a second machine ID that is different from the machine ID and (ii) a second login key that is different than the login key.

19. The system of claim 18, wherein the authentication server is configured for generating the new cookie and causing the new cookie to be stored on the user computer by:
  outputting an email addressed to the user, the email comprising a hyperlink to a Web site at which the new cookie is downloadable to the user computer for storage.

* * * * *